(12) United States Patent
Xu (10) Patent No.: US 9,302,468 B1
(45) Date of Patent: Apr. 5, 2016

(54) DIGITAL CUSTOMIZER SYSTEM AND METHOD

(71) Applicant: Ming Xu, Malvern, PA (US)

(72) Inventor: Ming Xu, Malvern, PA (US)

(*) Notice: Subject to any disclaimer, the term of this patent is extended or adjusted under 35 U.S.C. 154(b) by 0 days.

(21) Appl. No.: 14/541,844

(22) Filed: Nov. 14, 2014

(51) Int. Cl.
| | | |
|---|---|---|
| B41J 2/01 | (2006.01) | |
| B41J 2/205 | (2006.01) | |
| B41J 2/045 | (2006.01) | |
| B41F 16/02 | (2006.01) | |
| B41J 2/21 | (2006.01) | |

(52) U.S. Cl.
CPC ............. *B41J 2/04501* (2013.01); *B41F 16/02* (2013.01); *B41J 2/2054* (2013.01); *B41J 2/2121* (2013.01)

(58) Field of Classification Search
CPC ................................ B41J 2/0057; B41F 16/02
See application file for complete search history.

(56) References Cited

U.S. PATENT DOCUMENTS

| | | | |
|---|---|---|---|
| 3,844,806 A | 10/1974 | Wegmann | |
| 3,948,828 A | 4/1976 | Becker et al. | |
| 3,966,396 A * | 6/1976 | Howes | B41M 1/14 101/211 |
| 3,969,302 A | 7/1976 | Wegmann et al. | |
| 3,977,828 A | 8/1976 | Becker et al. | |
| 4,042,320 A | 8/1977 | Becker et al. | |
| 4,042,545 A | 8/1977 | Defago et al. | |
| 4,205,991 A | 6/1980 | Becker et al. | |
| 4,207,067 A | 6/1980 | Becker | |
| 4,265,630 A | 5/1981 | Bauerle | |
| 4,265,631 A | 5/1981 | Becker | |
| 4,281,999 A | 8/1981 | Becker et al. | |
| 4,370,144 A | 1/1983 | Skelly et al. | |
| 4,422,854 A | 12/1983 | Hahnle | |
| 4,460,374 A | 7/1984 | Abel et al. | |
| 4,550,324 A | 10/1985 | Tamaru et al. | |
| 4,559,150 A | 12/1985 | Becker | |
| 4,561,789 A | 12/1985 | Saito | |
| 4,659,383 A | 4/1987 | Lin et al. | |
| 4,689,078 A | 8/1987 | Koike et al. | |
| 4,713,081 A | 12/1987 | Becker | |
| 4,758,952 A | 7/1988 | Harris et al. | |
| 4,820,346 A | 4/1989 | Nowak | |
| 4,853,036 A | 8/1989 | Koike et al. | |
| 4,969,951 A | 11/1990 | Koike et al. | |
| 5,028,262 A | 7/1991 | Barlow | |
| 5,041,161 A | 8/1991 | Cooke et al. | |
| 5,065,167 A | 11/1991 | You et al. | |

(Continued)

FOREIGN PATENT DOCUMENTS

| | | |
|---|---|---|
| CN | 1157630 | 8/1997 |
| CN | 1608113 | 4/2005 |

(Continued)

*Primary Examiner* — Shelby Fidler
(74) *Attorney, Agent, or Firm* — B. Craig Killough; Barnwell Whaley Patterson & Helms (57) ABSTRACT

The present invention is a system and method for digitally customizing or decorating objects typically formed of substrates other than paper. The system includes a computer, color management software, and a full color inkjet printer designed for printing heat activatable ink. The ink comprises heat activatable colorant solids that are printed onto media in the form of an image that may be activated and/or transferred to a subsequent or final substrate by applying heat and intimate contact between the medium and the subsequent or final substrate. Control of first level dot gain upon printing and second level dot gain upon heat activation of the colorant provides an image that is of high quality, and even photographic quality, for most substrates that are usable with the system and method of the invention.

15 Claims, 5 Drawing Sheets

(56) References Cited

U.S. PATENT DOCUMENTS

| | | | |
|---|---|---|---|
| 5,114,477 A | 5/1992 | Mort et al. | |
| 5,164,232 A | 11/1992 | Henseleit et al. | |
| 5,229,786 A | 7/1993 | Suga et al. | |
| 5,250,121 A | 10/1993 | Yamamoto | |
| 5,281,261 A | 1/1994 | Lin | |
| 5,298,062 A | 3/1994 | Davies et al. | |
| 5,350,446 A | 9/1994 | Lin et al. | |
| 5,350,789 A | 9/1994 | Sagawa et al. | |
| 5,372,852 A | 12/1994 | Titterington et al. | |
| 5,385,957 A | 1/1995 | Tobias et al. | |
| 5,421,868 A | 6/1995 | Ayalia-Esquilin et al. | |
| 5,488,907 A | 2/1996 | Xu et al. | |
| 5,592,204 A | 1/1997 | Lin et al. | |
| 5,598,195 A | 1/1997 | Okamoto et al. | |
| 5,601,023 A | 2/1997 | Hale et al. | |
| 5,640,180 A | 6/1997 | Hale | |
| 5,643,387 A | 7/1997 | Berghauser | |
| 5,734,396 A | 3/1998 | Hale et al. | |
| 5,746,816 A | 5/1998 | Xu et al. | |
| 5,830,263 A * | 11/1998 | Hale et al. | 106/31.27 |
| 6,197,409 B1 | 3/2001 | Bodager et al. | |
| 6,284,004 B1 | 9/2001 | Burglin et al. | |
| 6,450,098 B1 | 9/2002 | Hale et al. | |
| RE38,952 E | 1/2006 | Hale et al. | |
| 2001/0022596 A1 * | 9/2001 | Korol | 347/10 |
| 2003/0146963 A1 | 8/2003 | Murray | |
| 2003/0156175 A1 * | 8/2003 | Blease et al. | 347/97 |
| 2005/0088468 A1 * | 4/2005 | Clark | 347/11 |
| 2005/0199152 A1 | 9/2005 | Hale | |
| 2007/0024655 A1 * | 2/2007 | Masashi | 347/14 |
| 2008/0246978 A1 * | 10/2008 | Braveman et al. | 358/1.9 |
| 2009/0213201 A1 * | 8/2009 | Numata et al. | 347/103 |
| 2010/0194829 A1 * | 8/2010 | Sekiya | 347/75 |

FOREIGN PATENT DOCUMENTS

| | | |
|---|---|---|
| CN | 101248146 | 7/2012 |
| EP | 0525994 A1 | 2/1993 |
| EP | 0602885 A1 | 6/1994 |
| EP | 745651 A1 | 12/1996 |
| EP | 0912792 | 5/1999 |
| GB | 1527396 | 10/1978 |
| GB | 2189436 A | 10/1987 |
| JP | 5353414 | 5/1978 |
| JP | 60042317 | 3/1985 |
| JP | 61118477 | 6/1986 |
| JP | 6257750 | 3/1987 |
| JP | 02049070 | 2/1990 |
| JP | 02049071 | 2/1990 |
| JP | 02051566 | 2/1990 |
| JP | 02051567 | 2/1990 |
| JP | 03234772 | 10/1991 |
| JP | 05221154 | 8/1993 |
| JP | 06057656 | 3/1994 |
| JP | 2005281523 | 10/2005 |
| JP | 2008223193 | 9/2008 |

\* cited by examiner

Step A

Step B

Step C

FIG 5

DIGITAL CUSTOMIZER SYSTEM AND METHOD

FIELD OF THE INVENTION

This invention relates to digitally customizing objects by digital imaging, and is more specifically related to a digital customizer system and method employing digital techniques and heat activatable colorants for digitally customizing and decorating objects.

BACKGROUND OF THE INVENTION

The use of digital computer technology allows images to be easily created. Video cameras or scanners may be used to capture an image to a computer. Image creation software allows easy origination of images, as well as modification of existing images. An image that is digitally captured may be printed by a computer driven printer, including desktop size ink jet printers that will print in multiple colors.

Digital technology allows mass customization of objects. High volumes of articles may be imaged ("mass"), with each article potentially having a different image ("customization").

Desktop printers for use in printing color images on paper with inkjet inks comprising soluble dyes that are not heat activatable yields less than optimal results when used with heat activatable inks such as sublimation dyes. There is a need for a digital customizer and method that is specifically designed for use with heat activatable inks such as sublimation dyes.

SUMMARY OF THE PRESENT INVENTION

The present invention is a system and method for digitally decorating or customizing objects typically formed of substrates other than paper. The system includes a computer, color management software, and a full color inkjet printer designed for printing heat activatable ink. The ink comprises heat activatable colorant solids that are printed onto media in the form of an image that may be activated and/or transferred to a subsequent or final substrate by applying heat and intimate contact between the medium and the subsequent or final substrate. The ink is contained in a cartridge prior to printing, with the cartridge adapted for the ink and inkjet printer. Control of first level dot gain upon printing and second level dot gain upon heat activation of the colorant provides an image that is of high quality, and even photographic quality, for most substrates that are usable with the system and method of the invention.

DETAILED DESCRIPTION OF PREFERRED EMBODIMENTS

Figure 1:
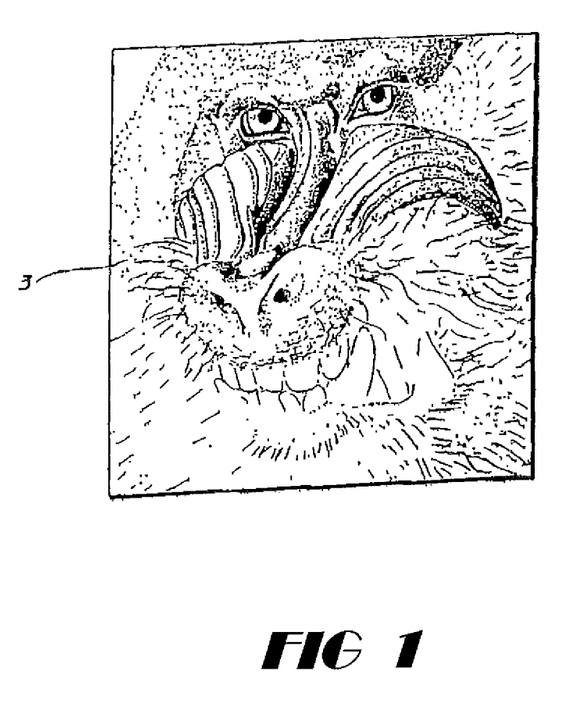
FIG. 1 illustrates an example of a design printed by a printer using the printing process.
Figure 2:
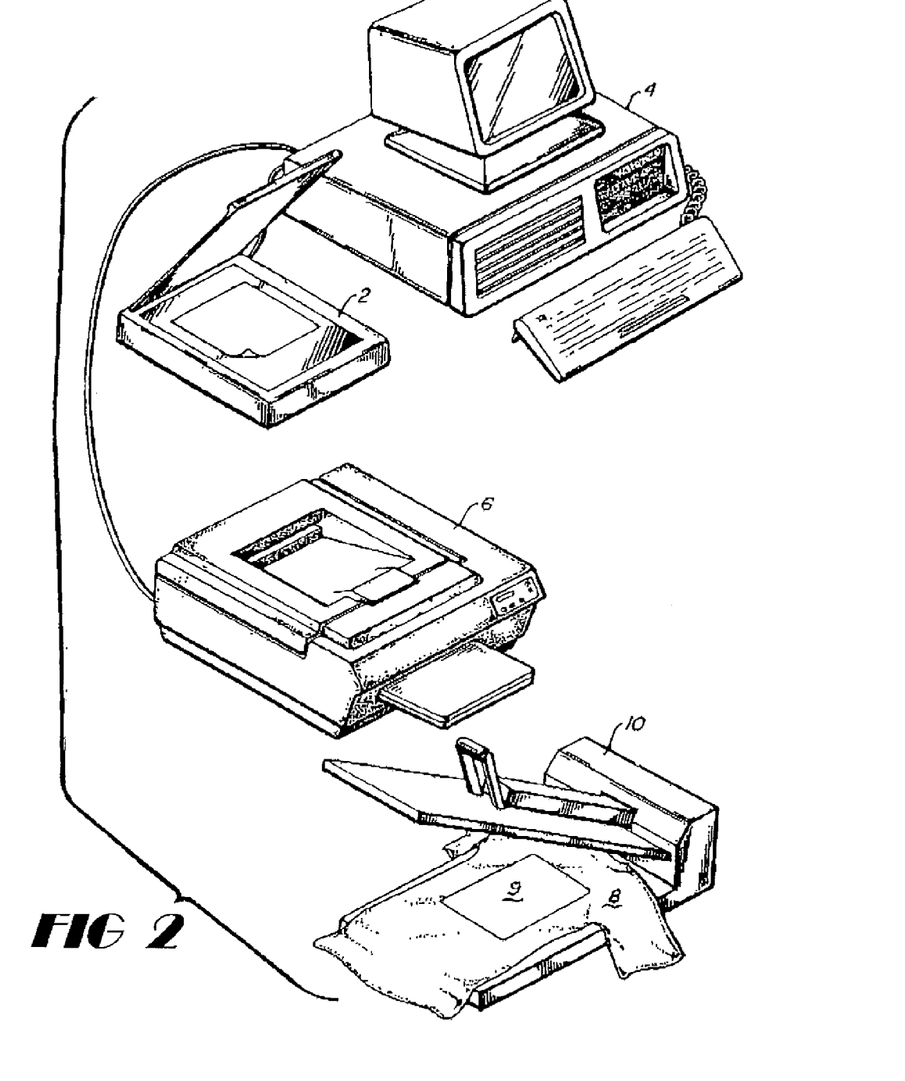
FIG. 2 is a diagrammatic illustration showing exemplary elements of computer and printing systems which could be used to achieve the printing process.
Figure 3:
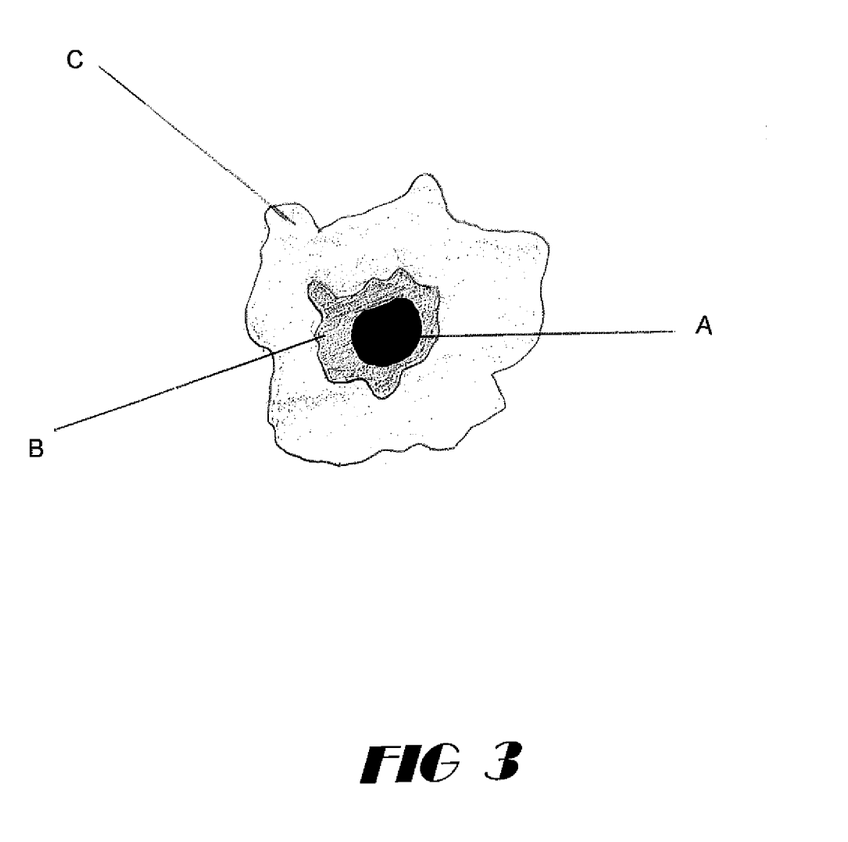
FIG. 3 demonstrates dot gain upon printing and additional dot gain after heat activation of the colorant.

A digital image is created using a computer 4, or a digital image is supplied to the computer. The computer directs a printer 6 to print the digital image. Any means of forming a digital image that may be printed from a computer may be used. For example, computer design graphic software may be used, or photography may be used. As shown in FIG. 3, the design may be read by a scanner 2 and the design communicated to computer 4. The design may be photographic, graphic, artistic, or simply letters or words. The use of cyan, yellow and magenta, and optionally, black ink compositions allow the printer to print in full color or multi-color designs.

The printer prints the image 3 onto a medium 9, which may be paper. After the image is printed onto the medium, the image is positioned against the final or receiver substrate 8, and activated by the application of heat and pressure from a heat supply 10. The image is permanently transferred from the medium to the final or receiver substrate by the application of heat and pressure. For example, the image may be transferred onto a textile substrate, such as a shirt 8, although the image may be transferred onto other materials as a final substrate, such as metal, ceramic, wood, or plastic. The design 3, which is printed onto the medium 9 without activating the ink, is placed against the final substrate which may be a shirt 8. A temperature which is sufficient to activate the dye is applied by a heat supply such as a heat press. This temperature will typically be about 200 degrees Celsius. This temperature is applied for a time sufficient to heat activate and transfer the ink solids in accordance with the requirements of the invention.

A heat supply such as heat transfer press 10 may be used to accomplish transfer of the inks from the medium to the substrate. In the embodiment described, activation, or sublimation, of the dye or colorant does not take place at the time of printing the image onto the medium, but occurs during the transfer from the medium to the substrate. In another embodiment, the image is printed onto the final or receiver substrate, and the colorant is heat activated after printing by the application of heat to the image.

The process described herein allows custom decoration of small or large quantities of objects ranging from clothing to housewares to personal items formed of substrates that have an affinity for the head activated colorants used with the process. The process permits different images to be printed in uninterrupted succession by the printer. Objects formed of different substrates may be imaged from the printed media, also in succession. For example, the printer can print a series of images, a, b, c, d . . . x, y z, in succession, wherein each of the images is different from the other. Each of the images printed on the media is printed to specifications that yield optimal quality on a specific substrate for which the image is intended. For example, image a may be intended for a textile substrate; image b for a different textile composition from image a; image c intended for a ceramic, image d for a ceramic of curved shape; image e for a wood substrate and image f for a metal substrate. To obtain optimal quality, such as photographic quality, the characteristics of the printed image, as well as the image itself, must be adapted to the substrate. Factors such as two levels of dot gain and other factors must be considered, and the performance of the printer changed for each image, as described herein for developing a data matrix. At the same time, especially by using a computer driving multiple printers, this process of custom decoration of objects can be achieved on a commercial, production basis using desk top size printers developed for the process.

The printer preferred to be used with the present invention is a full color piezoelectric drop-on-demand inkjet desk top size printer that will image a substrate, such as paper, having sizes up to ISO B3. The system as described herein produces an image of high quality that is comparable to images produced with industrial size, wide carriage width printers, using ink heat activatable dyes. However, the preferred printer is of desk top size.

The use of a small inkjet printer of desk top size is preferred, due to the use of the system to produce low volumes of an image. The small inkjet printer system according to the invention allows the production of low volumes of a particular image more efficiently than large industrial printers, and at much lower capital cost. It should be understood, however, that while the volume of each image is low, the overall quantity of images printed may be relatively high. The inkjet printer according to the invention may run continuously, but the images produced on the medium by the printer may each be different, one from the other. The system overcomes problems associated with using small printers that are not intended for use with inks comprising heat activatable colorants, but rather, are intended for use with inks comprising water soluble dyes, and are intended by original design solely for imaging paper.

Inkjet printing with aqueous (water based) inks comprising heat activatable colorants results in printing dot gain. Dot gain materially impacts image quality. First, when ink is printed using a 150 lpi (line per inch) resolution onto a substrate, which may be the intermediate substrate 9, the printed ink dot may gain 5 to 10% in size at a midtone area of an image. The ink dot gain may be due to mechanical impact or on-printer heating, liquid migration of the ink on the media by gravity or capillary forces, or by rimming, or by spreading/wetting behavior, such as a surface/interfacial energy value difference between the substrate and the liquid ink.

Additional, or second level, dot gain occurs when inks comprising heat activatable colorants are used, and results from heat activation of the colorants. The level of energy applied to the printed image, generally in the form of heat, is typically much higher than energy applied during the process of printing the image onto the substrate by the printer. Depending on properties of the ink, the substrate, the heat activating parameter, and the ink droplet size, this second level of dot gain may be as high as several hundred percent when compared to dot gain experienced during the printing step.

Figure 4:
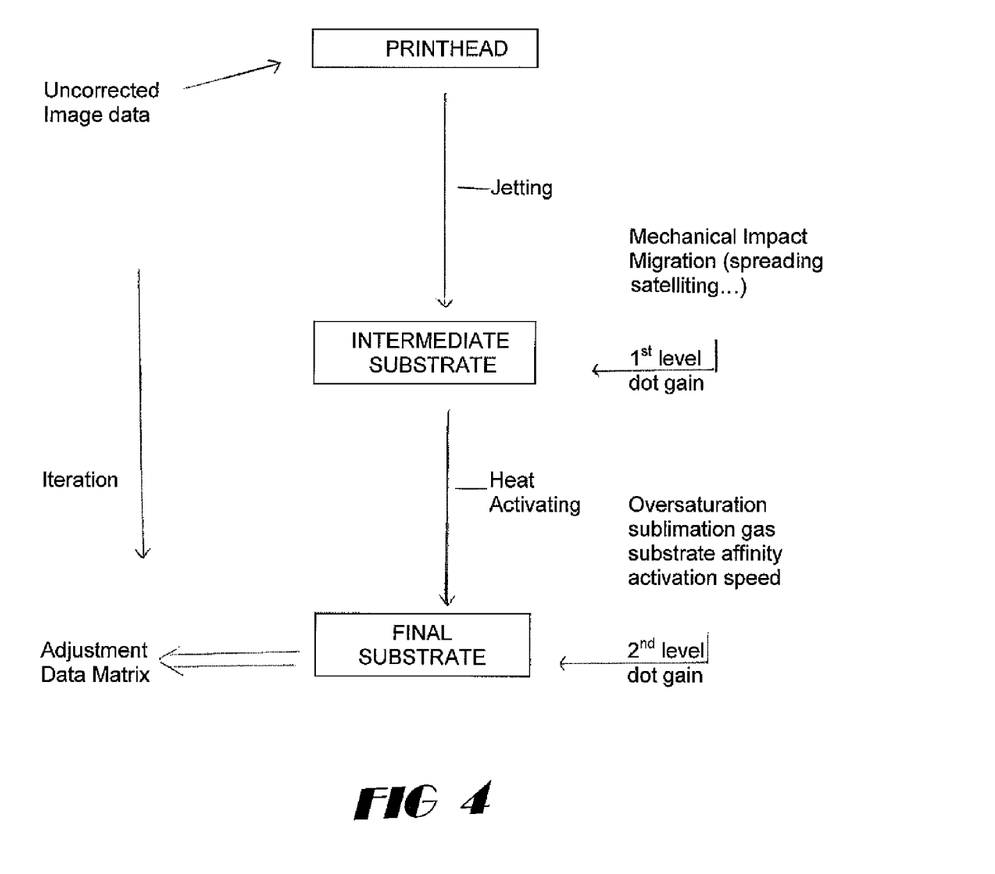
FIG. 4 is a flow chart indicating dot gain factors during the printing process.

FIG. 4 demonstrates the two levels of dot gain. The intended image dot size (A), upon printing on the intermediate substrate, may diffuse and increase to size (B). Upon heat activation, the dot size (C) is further increased on the final substrate. Two levels of dot gain, where the second level is the product of heat activation, is not encountered in simply printing an image on paper by means of a desk top size inkjet printer.

Dot gain, and particularly second level dot gain, must be controlled in order to obtain high definition, high-resolution image with faithful reproduction of photographic images when using heat activatable colorants. This is especially important in generating color images having a half tone area, or having fine details, where small and discrete ink dots are required for both physical resolution and color resolution. In addition, the magnitude of dot gain resulting from the energy activation process cannot be satisfactorily corrected or controlled by conventional methods, such as graphic application software, or color management/profiling tools, in order to achieve high resolution quality. High resolution printing techniques that are successful in conventional printing with small printers, using water soluble dyes printed on paper, are not satisfactory when using aqueous inks comprising heat activatable dyes or colorants that are insoluble, or sparingly soluble, in water. Such techniques tend to achieve only a fraction of the desired resolution in applications when the second level of dot gain is not considered, or is inadequately considered, as has been the case with the use of prior art printers and printing processes using liquid ink comprising heat activatable dyes or colorants. Conventional printers and print techniques have not adequately considered inkjet droplet formation for aqueous inks comprising heat activatable colorants.

The inkjet printer of the present invention preferably uses high resolution printheads preferably supported by firmware having an embedded algorithm calibrated with a data matrix that is dictated by the imaging characteristics of the specific heat activatable ink that is used. In particular, both the first and second levels of dot gain characteristics are taken into account for selected substrate(s) and heat activation parameters. The algorithm calculates and anticipates the final resolution/dot size, and adjusts printhead jetting behavior and ink droplet volume accordingly throughout the entire image printing cycle, based on the specific, final needs of the image, which is unique for each heat activatable ink application.

The embedded algorithm may be preset on the printer/printhead firmware, and may be adjusted or updated with data that is best suited to the ink and substrate to be printed. Optionally, the ink characteristic data may be communicated or transferred to the printhead by external electronic controls, such as a laptop computer. The controls may be used prior to printing, or during printing, of the substrate. Various controls may be employed, either directly, or through a variety of software communications such as a printer driver, raster image process software, color management/profiling software, add-on for graphic application software, etc. In addition, the level of control and degree of adjustment may be different for each ink color channel of the printer to best match color or image quality requirements.

Figure 5:
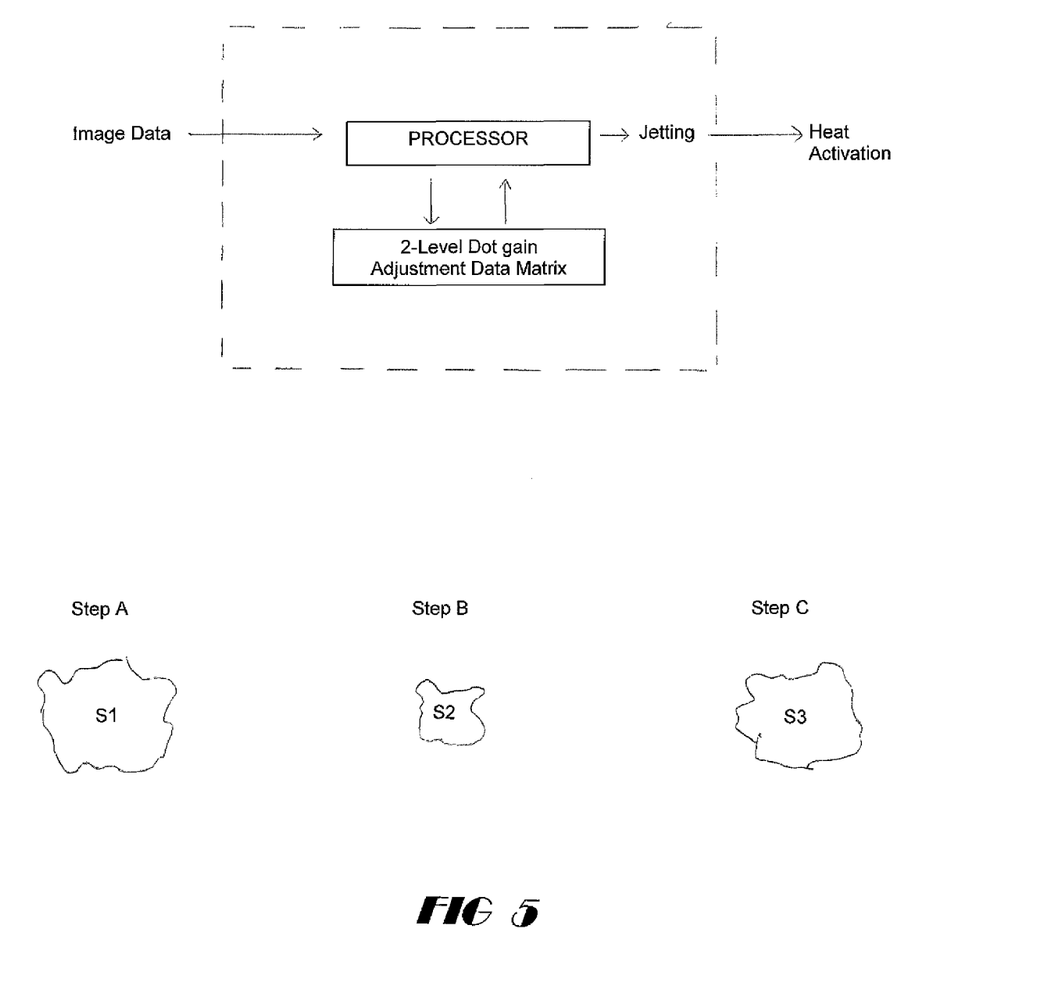
FIG. 5 is a flow chart demonstrating processor adjustment for dot gain control, and dot gain results from the adjustments.

The ink dot gain calibration and/or adjustment data matrix may be achieved by collecting information from factors such as ink color, the specific heat activatable colorant used, intermediate substrate characteristics, heat activation parameters, jetting behavior, and droplet size used to generate each color of the image. (FIG. 5) This determination may be made by empirical observation of actual printing of specified final substrates, similar to a color profiling process, but with particular analysis and measurement of dot gain data. Multiple iterations may be needed to achieve a preferred data matrix that yields high quality and accurate imaging.

FIG. 6 demonstrates the dot gain adjustment process when the factors listed above are considered. When image data is sent to a printhead (Step A), ink dot size (S1) represents a desired ink dot size for each color element after heat fixing of the colorant to the final substrate. Anticipation of dot size and adjustment of jetting are made based upon the adjustment data matrix, which provides information for correction based upon ink droplet size/volume, color combinations, dithering orientation and/or overlapping techniques. From this information, the printhead generates a corresponding dot size of S2, which is smaller proportionally for dot gain correction purposes, that is printed on the intermediate substrate, and prior to heat activation. Upon activation of the color image, the colorants forming the image obtain their final color, size and shape on the final substrate as the final size of S3. With a carefully fine-tuned algorithm and data matrix for both levels of dot gain adjustment, S3 will be as close as possible to the desired (S1) dot size in both size and color accuracy.

A preferred printhead has at least two arrays of printing nozzles that are offset, with at least one nozzle position in alignment with another. To achieve high quality imaging, a linear nozzle resolution of 150 nozzles per inch or higher is desired. That is, each nozzle array has at least 150 of printing nozzles per inch along the direction of the array. The nozzle arrays may be fed by different ink reservoirs or Ink tanks, each of very small volume or capacity and positioned inside the printhead upstream from the piezoelectric mechanism, or the nozzles may share one ink reservoir, in order to gain high-speed printing, or to improve native printing resolution. By using various physical mounting configurations, and/or applying multiple printing passes, jetting frequency, and/or advancing motor and scanning motor stepping gaps, as well as jetting variable size ink dots (ink droplet with different volumes), native printing resolution of 600 to 1440 dpi, or more, may be achieved, depending on specific ink droplet volumes.

To achieve proper droplet formation with well-defined jetting outcomes, careful selection of the jetting waveform or wave pulse is employed. The voltage-time function may be single, double or multiple-peak in shape, depending on the fluid flow dynamic behavior of the heat activatable ink of each and all colors used. Overlapping of multiple pulses with various amplitudes (voltage), shape (for example, rectangular, triangle, sine, etc.), and durations (both pulse and dead time) may be used to secure successful pinch off of droplets, while minimizing satellites of jetting of the ink.

While the medium onto which the image is printed for subsequent transfer may be paper, the medium may also be film, textile, metal or other substrates, for either direct or transfer printing applications. With transfer imaging processes, the printing medium may be called an intermediate substrate or medium. While different conveyance mechanisms for the medium may be employed, it is preferred that the medium is transported through the printer carriage in a direction perpendicular to the printhead scan direction. The printer must convey the medium/substrate through the printer during the printing process at a selected advancing velocity in order to achieve acceptable print quality. The surface characteristics of materials of films, metals and textiles vary to a material degree from paper and from each other. The surface friction of metal is substantially different from a textile such as a poly/cotton blend. Accordingly, the medium conveyance or transport mechanism of the printer when used to print media other than paper must be constructed for media of various thicknesses, rigidity and/or surface property at a desired velocity to ensure adequate ink droplet impact stability.

The inkjet printer is preferred to use factory sealed ink cartridges that contain the preferred aqueous ink comprising heat activatable dyes. In order to eliminate and/or minimize bacteria contamination, chemical reactions such as oxidation or reduction, jetting bubbling, satelliting, and other adverse impacts during the ink drop formation process, the liquid ink in the ink cartridge should have no more than 5.0 parts per million air, and is more preferred to have no more than 3.5 parts per million air, and is most preferred to have no more than 3.0 parts per million air after the cartridge is filled with liquid ink and sealed. The inkjet ink according to the invention tends to develop undesired crystallization due to presence of solids in the ink when the air volume in the filled cartridge is higher than the specified amount.

In one embodiment, air is removed from the ink so that air is present in the ink at a level of no more than 3.5 parts per million prior to filling the cartridge. Degassing occurs during the filling process so that air is present at a level of no more than 3.5 parts per million after completion of the filling process. Air may be removed from the cartridge after it is filled and the ink has settled and has released additional dissolved air.

The preferred printer of the present invention allows a selection of ink droplet sizes printed from the print head of the printer that form each dot. Selection of ink droplet sizes is either automatic, based on imaging information and an algorithm calibrated from software or firmware, or manually by the user for specific imaging requirements. Ink droplet size selection is employed to reduce or eliminate undesired dot gain or color matching produced at both jetting and jetting processes. For instance, 400% dot gain (resulting from the particular ink, color, tone mixing dithering, substrate, and heat activation parameters employed) may be controlled by using proportionally smaller ink droplets during jetting, thereby achieving a satisfactory result of half tonal precision. Preferably, at least three levels of droplet size are employed. These droplet sizes may be categorized as small (Sm), medium (Med) and large (Lg), the calibrated algorithm or user can select which category is preferred to produce the desired outcome. While smaller ink droplet size enhances precision, accuracy of image dots, and the total of number of colors through dithering patterns, as well as avoiding undesired image continuous tone generation, larger ink droplet sizes improve imaging intensity, printing speed and ink usage effectiveness and efficiency. Careful balancing of the selections of droplet volume combination, through the use of the heat activatable ink characteristic data matrix and imaging algorithm, may result in an optimal outcome.

A volume of ink printed for each dot is preferred to be between 1 picoliter and 15 picoliters. Each Small droplet is preferred to have a volume of not more than 4 picoliters; each Medium droplet is preferred to have a volume of not more than 7 picoliters; and each Large droplet is preferred to have a volume of not more than 15 picoliters.

In a specific embodiment, the printer emits selectable ink droplet sizes of small droplets of not more than 2 picoliters; medium droplets of not more than 6 picoliters, and large droplets of not more than 9 picoliters. At the large droplet setting for four colors (CMYK), the printer delivers an ink dot of 36 (4×9) picoliters. Grey scale discharging of more than three volume levels of ink droplets may also be used for more sophisticated control.

In addition to printing resolution or ink droplet size, printed image quality is impacted by the number of colors that comprise the image. To reproduce a photographic image, fine details must be generated, and also, faithful reproduction of each of the original colors of each dot/pixel should be achieved, especially for transitional colors and/or facial (skin color) toning accuracy. In general, a photo quality printed image having resolution of no less than 1200 dpi (sometimes called native dot-per-inch resolution), and not less than total of half a million (500,000) colors should be achieved. High printing resolution, achieved by combining multiple colors of inks, and employing proper dithering or half-toning techniques, prefers color cell (the smallest color component in dithering or half-toning) sizes of not less than 300 cell units per inch. Though higher printing resolution may result in finer color cells, human eyes unaided by magnification normally cannot differentiate details beyond 300 units per inch. The present invention preferably uses a cyan, yellow, magenta, and black (4-color) ink set, with 600 to 1200 DPI printing resolution, with selectability of droplet sizes as described herein, and use of a dot gain algorithm for dot size control. These characteristics enable the process to produce photographic image quality at acceptable printing speeds.

The printhead may employ a relatively broad spectrum of driving force frequencies for the piezoelectric system. Variable driving force frequencies allow the production of well-defined ink droplets of variable volumes. "Well-defined ink droplets" means minimizing undesired non-jetting, tailing/Rayleigh breakup, elongation, satelliting or bubble bursting of the droplet at the tip of the surface of printing nozzles. Depending on the physical properties of the heat activatable ink, the driving force frequency may be between 5 kHz and 40 kHz, preferably between 8 to 20 kHz for small printers of the preferred embodiment.

In another embodiment of the present invention, a pressure regulating mechanism is used at the printhead through a small ink reservoir or ink tanks. Inkjet ink used with present invention comprises heat activatable colorant, with various densities and ink compositions for different colors, each of will have different physical properties (such as flow behavior due to capillary forces) from soluble dye based inks or pigment inks, such as gel inks. To maintain an optimal meniscus for jetting, jetting repeatability, jetting stability and precise drop shape control at the tip of the printing nozzle, the ink pressure regulating mechanism is preferred to be located at the printhead near the piezoelectric element, where vibration forces with various waveforms are generated by the driving electronics via variety of piezoelectric deformation modes. The specific pressure polarity and/or pressure value for each local ink reservoir is calibrated and adjusted based on the physical properties of the ink and the jetting frequencies discussed herein. Preferably, a negative pressure of 100 Pascal to 1000 Pascal is used. Negative pressure applied on the ink reservoir (s) prevents ink meniscus deformation, and also assists the meniscus in recovering from jetting dynamics after production of each ink droplet. The pressure sensor may be installed at the printhead for constant and just-in-time pressure regulation based on ink fluid flow properties. Optionally, piezoelectric printheads with internal ink circulation loops are used to further enhance ink uniformity, stability, and jetting stability.

The liquid inkjet ink has a preferred viscosity of not less than 5 cP, and may have a viscosity from 5 to 100 cPs, with total water content of not less than 30% by weight of the total ink formulation. A preferred viscosity range is from 5 cP to 30 cP. A heat activatable colorant, such as sublimation dye, is present in the ink. The ink as printed comprises solid dye particles. The specific amount of the colorant(s) is supplied by the printer to the medium to achieve proper color intensity and image quality upon heat activation. The colorant is preferred to range from 1% to 15% by weight of the total ink formulation.

In order to avoid droplet formation difficulties and/or inconsistency of the jetting process due to the presence of high liquid viscoelasticity, polymeric constituents and materials, if used, are preferred to be below 500,000 in molecular weight. Dispersants, binders, physical property modifiers, rheology control agents, or thixotropic additives having such properties are preferably avoided in the ink formulation. More preferably, polymeric materials, either natural or synthetic, with molecular weights, if used, are below 300,000 in molecular weight. Heat activatable colorants suitable for use may include various disperse dyes or sublimation dyes with different activating energy levels. The colorants are activated or sublimed by applying heat to the printed substrate and/or transfer substrate. Generally, the heat activation temperature does not exceed 235° C., and most preferably, does not exceed 210° C. Examples of colorants, in varying ratios, include but are not limited, to C.I. Disperse Orange 13, 29, 31:1, 33, 49, 54, 55, 66, 73, 119 and 163; C.I. Disperse Red 4, 11, 54, 60 72, 73, 86, 88, 91, 92, 93, 111, 126, 127, 134, 135, 143, 145, 152, 153, 154, 159, 164, 167:1, 177, 181, 204, 206, 207, 221, 258, 278, 283, 288, 311, 323, 343, 348 and 356; C.I. Disperse Violet 33; C.I. Disperse Blue 4, 13, 56, 73, 113, 128, 148, 154, 158, 165, 165:1, 165:2, 183, 197, 201, 214, 224, 225, 257, 266, 267, 287, 358, 359, 360, 379, Disperse Brown 26, 27; and Disperse Yellow 5, 42, 54, 64, 79, 82, 83, 93, 99, 100, 119, 122, 124, 126, 160, 184:1, 186, 198, 199, 204, 224 and 237. Disperse or sublimation dyes with modified forms such as latent azo dyes capable of forming heat activatable dyes, grafted disperse/sublimation dyes, polymerized or encapsulated disperse/sublimation dyes may also be used.

Preferably, the present invention uses a 4-color ink set with cyan, magenta, yellow and black (CMYK) as the ink colors. Other process colors or spot colors/special colors, including colors outside of the human perception range, may also be used to broaden color gamut, printing efficiency, or special color and/or texture effect. In some occasions, inks without heat activation properties may be used alone or in combination with inks comprising heat activatable colorants for intermediate medium printing surface conditioning, sublimation/diffusion masking, polymeric material transferring etc.

The colorant remains in the ink as a particulate that is conditioned for heat activatable ink jetting. A process of printing the ink onto the medium for subsequent heat activation or sublimation to achieve optimal imaging results is described. Suitable examples of inks for use in the system may be referenced from U.S. Pat. No. 8,425,029.

What is claimed is:

1. A method of digitally customizing objects, comprising the steps of:
   providing a digital image file to a computer;
   selecting a substrate upon which an image from the digital image file is to be printed;
   transmitting the digital image file to an inkjet printer;
   choosing a volume of ink emitted per droplet by the inkjet printer, wherein the ink comprises heat activated dye solids, and the volume of ink is chosen as a function of an acceptable primary dot gain on a medium upon printing of the image on the medium and an acceptable secondary dot gain on the selected substrate resulting from gasification of the heat activated dye solids and subsequent fixation of the heat activated dye solids upon heat activated transfer of the image from the medium to the selected substrate;
   forming the image on the media by the inkjet printer by emitting a plurality of ink droplets, wherein each ink droplet is of the volume chosen, and wherein the plurality of ink droplets form the image on the media and the primary dot gain is within the acceptable primary dot gain; and
   heat activating the heat activated dye solids to gasify and permanently fix the image to the selected substrate, wherein the secondary dot gain is within the acceptable secondary dot gain.

2. The method of digitally customizing objects of claim 1, further comprising the steps of the computer providing a plurality of digital files to the inkjet printer, with each of the digital files representing an individual image;
   selecting a corresponding individual substrate for each individual image from the digital image files is to be printed;
   choosing a volume of ink emitted per droplet by the inkjet printer for each individual image and each individual substrate, wherein the ink comprises heat activated dye solids, and the volume of ink is chosen as a function of an acceptable primary dot gain on a medium upon printing of the individual image on the medium and an acceptable secondary dot gain on the corresponding individual substrate upon gasification of the heat activated dye solids and subsequent fixation of the heat activated dye solids upon heat activated transfer of the individual image on its corresponding individual substrate;

wherein each individual image is printed by the inkjet printer on a corresponding medium, and each individual image is formed by the plurality of ink droplets comprising heat activated dye solids;

forming each individual image on its corresponding medium by the inkjet printer by emitting a plurality of ink droplets, wherein each ink droplet is of the volume chosen, and wherein the plurality of ink droplets form the image on the media and the primary dot gain is within the acceptable primary dot gain; and heat activating each individual medium and the heat activated dye solids to permanently fix each individual image to its corresponding individual substrate, wherein the secondary dot gain is within the acceptable secondary dot gain for the corresponding individual substrate.

3. The method of digitally customizing objects of claim 2, wherein the individual images are provided to a plurality of inkjet printers.

4. The method of digitally customizing objects of claim 1, wherein the inkjet printer is constructed to eject ink droplets in three volume settings.

5. The method of digitally customizing objects of claim 3, wherein each inkjet printer of the plurality of inkjet printers is constructed to print media having a size up to ISO B3 and wherein the inkjet printer is constructed to eject ink droplets in three volume settings.

6. The method of digitally customizing objects of claim 1, further comprising the step of removing air from an ink cartridge so that the ink cartridge contains not more than 3.5 part per million air prior to installing the ink cartridge in the inkjet printer, wherein the ink cartridge supplies liquid ink comprising heat activated dye solids to the inkjet printer.

7. The method of digitally customizing objects of claim 1, as described in claim 1, wherein the inkjet printer is a full color printer.

8. The method of digitally customizing objects of claim 1, wherein the image is a photographic quality image after heat activation of the heat activated dye solids.

9. The method of digitally customizing objects of claim 1, wherein the inkjet printer prints ink comprising heat activated dye solids in four primary colors and the image is a full color photographic quality image.

10. The method of digitally customizing objects of claim 1, wherein a processor chooses the volume of ink emitted by the inkjet printer as a function of the acceptable primary dot gain on the medium upon printing of the image on the medium and the acceptable secondary dot pain on the selected substrate resulting from gasification of the heat activated dye solids and subsequent fixation of the heat activated dye solids upon heat activated transfer of the image from the medium to the selected substrate.

11. The method of digitally customizing objects of claim 1, wherein a volume of ink printed for each droplet is not more than 4 picoliters at a first setting, and a volume of ink printed for each droplet is user selectable to be not more than 7 picoliters at a second setting, and a volume of ink printed for each droplet is user selectable to be not more than 15 picoliters at a third setting.

12. The method of digitally customizing objects of claim 1, wherein the image as printed has a resolution of no less than 1200 native dot-per-inch resolution, and the printer prints not less than 500,000 colors.

13. The method of digitally customizing objects of claim 1, wherein the inkjet printer is constructed to print media having a size up to ISO B3 and wherein the inkjet printer is constructed to eject ink droplets in three volume settings.

14. The method of digitally customizing objects of claim 1, wherein the viscosity of the liquid ink is not less than 5 centipoise.

15. The method of digitally customizing objects of claim 1, wherein acceptable secondary dot gain is a function of the heat activated dye solids forming the image on the medium, a material from which the medium is formed, heat activation and gasification parameters of the ink as printed on the medium, and ink jet printer jetting behavior.

\* \* \* \* \*